(12) United States Patent
Maruyama et al.

(10) Patent No.: US 7,713,049 B2
(45) Date of Patent: May 11, 2010

(54) INJECTING MOLDING MACHINE HAVING A TORQUE DETECTING DEVICE

(75) Inventors: Junpei Maruyama, Yamanashi (JP); Satoshi Takatsugi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 205 days.

(21) Appl. No.: 11/953,923

(22) Filed: Dec. 11, 2007

(65) Prior Publication Data

US 2009/0022838 A1 Jan. 22, 2009

(30) Foreign Application Priority Data

Jul. 17, 2007 (JP) ............... 2007-186032
Oct. 30, 2007 (JP) ............... 2007-281981

(51) Int. Cl.
B29C 45/76 (2006.01)

(52) U.S. Cl. .................. 425/145; 425/149; 425/150

(58) Field of Classification Search ............... 425/145, 425/149, 150

See application file for complete search history.

(56) References Cited

U.S. PATENT DOCUMENTS 6,325,954 B1 * 12/2001 Sasaki et al. ............... 425/145
7,074,028 B2 * 7/2006 Watanabe et al. ........... 425/145
7,291,297 B2 * 11/2007 Weatherall et al. .......... 425/145
7,435,070 B2 * 10/2008 Shiraishi et al. ............. 425/145
2006/0278014 A1 12/2006 Okada et al.

FOREIGN PATENT DOCUMENTS

| DE | 19834086 C1 | 1/2000 |
| EP | 1439047 A1 | 7/2004 |
| JP | 60-076321 A | 4/1985 |
| JP | 62-060621 A | 3/1987 |
| JP | 01-308611 A | 12/1989 |
| JP | 4284221 A | 10/1992 |
| JP | 2006327127 A | 12/2006 |

OTHER PUBLICATIONS

EP Extended Search Report for EP07122817.5 dated Nov. 25, 2008.
Notice of Reasons for Rejection for JP2007281981 mailed Sep. 9, 2008.

* cited by examiner

*Primary Examiner*—Tim Heitbrink
(74) *Attorney, Agent, or Firm*—Lowe Hauptman Ham & Berner LLP

(57) ABSTRACT

When a screw equipped with a check ring is moved forward, torque acting on the screw is detected, and whether the check ring is closed is determined on the basis of the detected torque. The screw is rotated in reverse when the check ring is determined not to be closed, and the reverse rotation of the screw is stopped when the check ring is determined to be closed. The reverse rotation of the screw is thereby controlled so that the screw is rotated in reverse by an optimal amount for reliably closing the check ring.

9 Claims, 7 Drawing Sheets

INJECTING MOLDING MACHINE HAVING A TORQUE DETECTING DEVICE

RELATED APPLICATIONS

The present application is based on, and claims priority from, Japanese Application Number 2007-281981 filed Oct. 30, 2007 and Japanese Application Number 2007-186032 filed Jul. 17, 2007, the disclosure of which is hereby incorporated by reference herein in its entirety.

BACKGROUND OF THE INVENTION

1. Field of the Invention

The present invention relates to an injection molding machine, and more particularly to an injection molding machine that determines whether a check ring is closed or not during forward movement of a screw and rotates the screw in reverse by an amount necessary to close the check ring.

2. Description of the Related Art

In a known technique described in, for example, Japanese Patent Application Laid-Open No. 62-060621, the check ring in an injection molding machine is closed by rotating the screw in reverse (or in the direction reverse to the direction of the screw during metering process) at the start of injection. The amount of reverse rotation of the screw is calculated and set according to the spacing between the check ring and check seat when the check ring is open.

In another known technique described in, for example, Japanese Patent Application Laid-Open No. 1-308611, the screw is rotated in reverse in synchronization with the injection speed during injection process. In yet another known technique described in, for example, Japanese Patent Application Laid-Open No. 60-76321, the check ring is closed by rotating the screw in reverse while moving it in positive direction during the period between metering and injection.

The amount by which the screw must be rotated in reverse to close the check ring varies with the resin viscosity, injection speed, and other conditions. Therefore, if the amount of reverse rotation at injection is set as described in the above conventional art, the amount may be not enough to close the check ring completely, or the amount may be excessive, depending on the resin and molding conditions.

If the amount of reverse rotation of the screw is not enough to close the check ring completely, the amount of resin injected becomes disadvantageously unstable. If the amount of reverse rotation is excessive, an extra amount of resin is fed behind the screw, causing problems of increased metering time and accumulation of resin.

SUMMARY OF THE INVENTION

The object of the present invention is to provide an injection molding machine that performs control so as to rotate the screw in reverse by the optimal amount for reliably closing the check ring of the screw.

To achieve the above object, the injection molding machine according to the present invention includes a screw equipped with a check ring, torque detecting means for detecting torque acting on the screw during forward movement of the screw, check ring closure state determining means for determining whether the check ring is closed or not on the basis of the torque detected by the torque detecting means, and screw reverse rotation control means for controlling reverse rotation of the screw on the basis of the determination by the check ring closure state determining means.

The check ring closure state determining means may compare torque during forward movement of the screw with a first reference value, and determine that the check ring is not closed when the torque is greater than the first reference value or that the check ring is closed when the torque is less than or equal to the first reference value.

After determining that the check ring is not closed because the torque is greater than the first reference value, the check ring closure state determining means may determine that the check ring is closed at a point of time when the torque reaches a peak and that the check ring remains closed after a point of time when the peak appears.

The check ring closure state determining means may compare an integrated value of the torque from the start of forward movement of the screw to the current time with a second reference value, and determine that the check ring is not closed when the integrated value of the torque is greater than the second reference value or that the check ring is closed when the integrated value of the torque is less than or equal to the second reference value.

On the basis of a determination by the check ring closure state determining means, the screw reverse rotation control means may rotate the screw in reverse when the check ring is determined not to be closed or may stop the reverse rotation of the screw when the check ring is determined to be closed.

The screw reverse rotation control means may rotate the screw in reverse from when the screw starts moving forward until a first predetermined time elapses, or until the screw moves forward a first predetermined distance from the screw position at a point of time when the screw starts moving forward, regardless of the determination by the check ring closure state determining means.

The screw reverse rotation control means may stop the reverse rotation of the screw after a second predetermined time has elapsed since the check ring closure state determining means determined that the check ring was closed, or after the screw has moved forward a second predetermined distance from the screw position at a point of time when the check ring was determined to be closed.

The injection molding machine may include display means for displaying an amount of reverse rotation of the screw from when the screw starts rotating in reverse until the check ring closure state determining means determines that the check ring is closed.

The forward movement of the screw may be forward screw movement in the injection process or forward screw movement in the interval from the completion of metering to the start of injection.

In the above configuration, the injection molding machine according to the present invention can reliably close the check ring even if the resin viscosity and other conditions vary. It is also possible to minimize the increase in metering time and accumulation of resin due to reverse rotation of the screw. In addition, if the amount of reverse rotation of the screw necessary to close the check ring is displayed on the screen, the operator can use the displayed value as a guide for setting an amount of reverse rotation of the screw.

BRIEF DESCRIPTION OF THE DRAWINGS

The above and other objects and features of the present invention will become apparent from the following description of embodiments with reference to the accompanying drawings, in which.

DETAILED DESCRIPTION OF THE PREFERRED EMBODIMENTS

Figure 1:
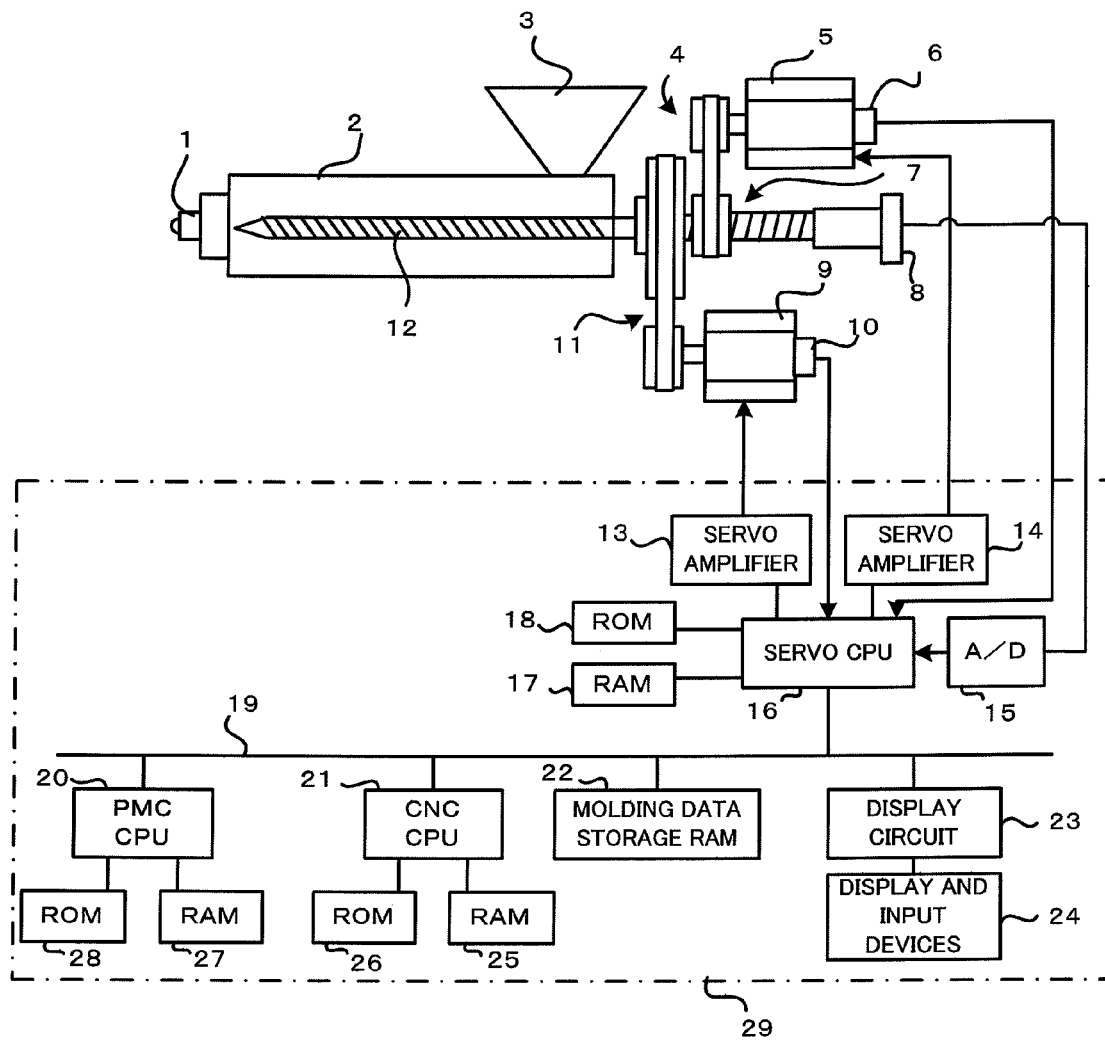
FIG. 1 is a block diagram showing the main sections of an injection molding machine in an embodiment of the present invention.

FIG. 1 is a block diagram showing the main sections of an injection molding machine in an embodiment of the present invention.

An injection cylinder 2, in which a screw 12 is inserted, has a nozzle 1 at its front end. The injection cylinder 2 has a hopper 3 near its rear end, through which resin pellets are supplied to the injection cylinder 2. The screw 12 is rotated when driven by a screw rotating servo motor 9 through a transmission mechanism 11. The screw 12 is also axially driven to control injection and back pressure by an injection servo motor 5 through a transmission mechanism 4 and a conversion mechanism 7 such as a ball screw and nut that converts rotational motion into rectilinear motion.

The injection servo motor 5 and screw rotating servo motor 9 are equipped with respective position/speed detecting devices 6, 10 for detecting their rotational position and speed. The position/speed detecting devices 6, 10 are used to detect the rotational position and speed of the screw 12 as well as the longitudinal position and speed (injection speed) of the screw 12 in the axial direction.

A control unit 29 for controlling the injection molding machine has a CNC CPU 21, which is a microprocessor for numerical control, a PMC CPU 20, which is a microprocessor for a programmable machine controller, and a servo CPU 16, which is a microprocessor for servo control. These microprocessors can interact by selective mutual input and output of information through a bus 19.

The servo CPU 16 is connected to a ROM 18 in which a dedicated servo control program for position, speed, and electric current loop processing is stored, and a RAM 17 for temporarily storing arithmetic data. The servo CPU 16 is also connected through an analog-to-digital (A/D) converter 15 to a pressure sensor 8 disposed on the main body of the injection molding machine for detecting various types of pressure such as injection pressure. The pressure sensor 8 may be a load converter (load cell), for example.

In addition, the servo CPU 16 is connected to a servo amplifier 14 for driving the injection servo motor 5, which is connected to an injection axis, and a servo amplifier 13 for driving the screw rotating servo motor 9, which is connected to a screw rotating axis; the amplifiers drive their respective motors according to commands from the servo CPU 16. The outputs of the position/speed detecting devices 6, with which the servo motors 5, 9 are equipped are fed back to the servo CPU 16. The rotational position of the servo motors 5, 9 is calculated by the servo CPU 16 according to positional feedback signals from the position/speed detecting devices 6, 10, and updated and stored in respective current position storage registers.

The axis configuration shown in FIG. 1 includes only the servo motors 5, 9 for driving the injection and screw rotating axes, the position/speed detecting devices 6, 10 for detecting the rotational position and speed of the servo motors 5, 9, and the servo amplifiers 13, 14. Other axes, such as a mold clamping axis for clamping a mold and an ejector axis for removing a molded article from the mold, are provided in a configuration (including servo motors, amplifiers, and position/speed detecting devices) similar to the configuration shown, so they are omitted in FIG. 1.

The PMC CPU 20 is connected to a ROM 28 where programs such as a sequence program for controlling the operation sequence of the injection molding machine are stored, and a RAM 27 for temporarily storing arithmetic data. The CNC CPU 21 is connected to a ROM 26 where programs such as an automatic operation program for controlling the injection molding machine as a whole and a processing program related to the present invention for determining when to complete suck-back are stored, and a RAM 25 for temporarily storing arithmetic data.

A molding data storage RAM 22 incorporating nonvolatile memory elements stores data related to injection molding, such as molding conditions, various settings, parameters, and macro variables.

A manual data input device 24 with a display is connected through a display circuit 23 to the bus 19, enabling operations such as selection of a graph display screen or function menu and input of various types of data. A CRT, liquid crystal, or any other type of display may be selected as appropriate. The display circuit 23 has a check ring closure indicator, which will be described later, and is used to display the amount by which the screw is rotated in reverse in the interval from when the screw starts rotating in reverse until the check ring is determined to be closed.

In the above configuration, well-known digital servo processing takes place to control the activation of the servo motors 5, 9. More specifically, the PMC CPU 20 controls the operation sequence of the injection molding machine as a whole; the CNC CPU 21 distributes motion commands to the servo motors for respective axes according to the operation programs in the ROM 26 and molding conditions and other data stored in the molding data storage RAM 22; and the servo CPU 16 performs conventional servo control such as position loop control, speed loop control, and current loop control according to the motion commands distributed to the axes and the position, speed, and other feedback signals detected by the position/speed detecting devices 6, 10.

The above configuration is no different from that of the control unit in conventional electrically-powered injection molding machines, but the control unit 29 for controlling this injection molding machine incorporates means for controlling reverse rotation of the screw according to the present invention.

The control unit 29 shown in FIG. 1 differs from the control unit in conventional electrically-powered injection molding machines in that the ROM 26 contains a processing program for detecting torque acting on the flight section of a screw equipped with a check ring and controlling reverse rotation of the screw on the basis of the detected torque. The injection molding machine controls reverse rotation of the screw equipped with the check ring by using the CNC CPU 21 to execute the processing program.

Figure 2:
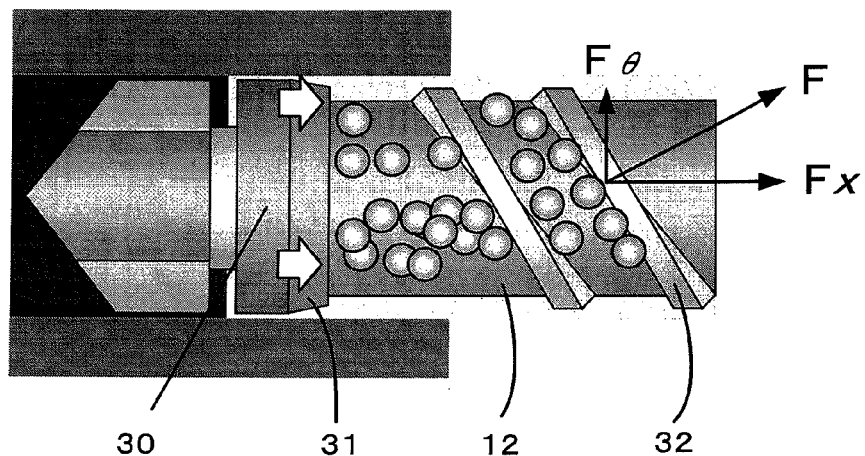
FIG. 2 illustrates how the force of resin backflow acts on the screw of the injection molding machine during forward movement of the screw.

FIG. 2 illustrates how the force of resin backflow acts on the screw 12 during forward movement of the screw in, for example, the injection process. If the check ring 30 is not closed completely, resin flows rotating in reverse, producing a force F pressing a flight 32 of the screw 12 forward. The flight 32 is formed so as to extend in an oblique direction with respect to the axial direction of the screw, so the force F is divided into a component Fx in the axial direction of the screw and a component Fθ in the direction of rotation about the screw axis. The component Fθ in the direction of rotation acts so as to rotate the screw in reverse. In the present invention, the component Fθ is measured, to detect resin backflow and determine the state of the check ring.

Figure 3:
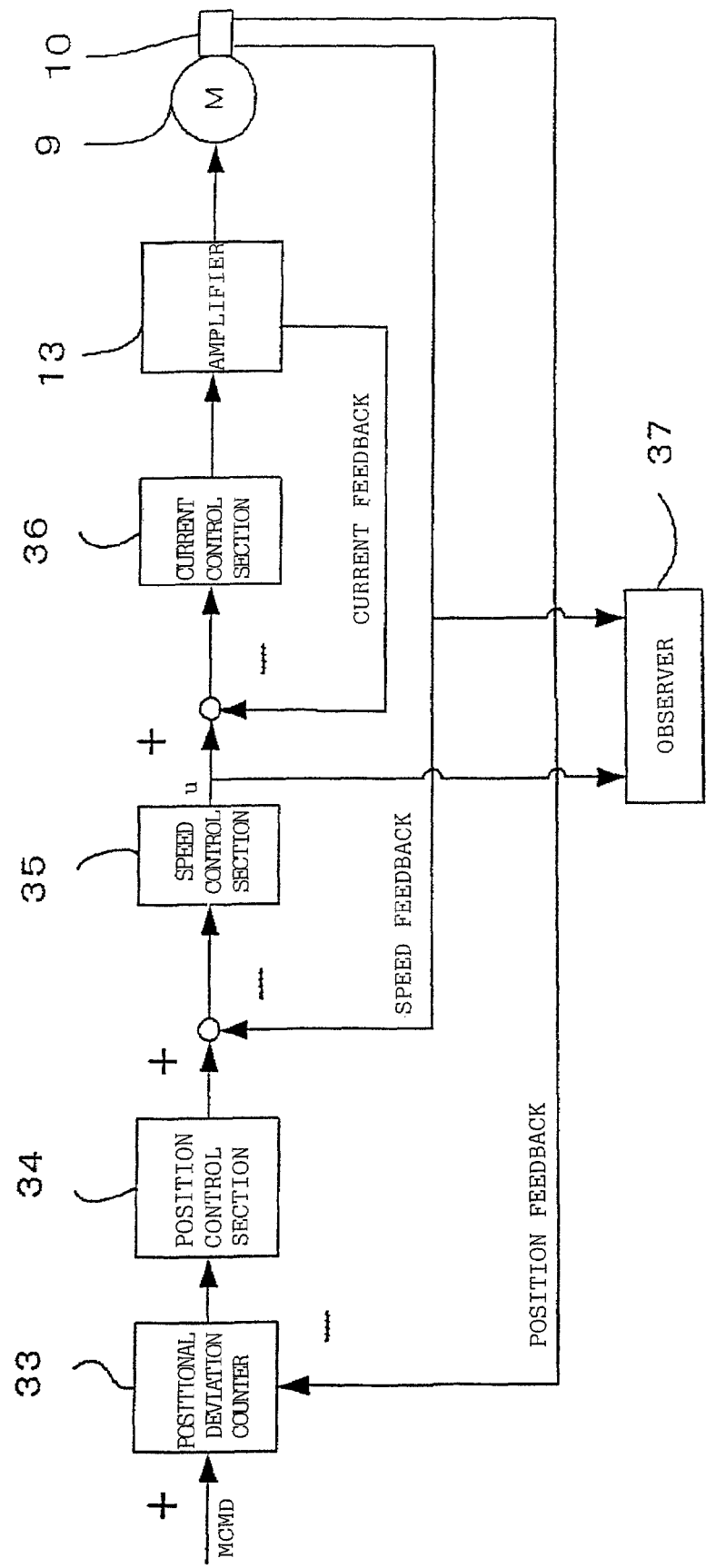
FIG. 3 illustrates how an observer is used to obtain torque acting on a flight section of the screw.

FIG. 3 illustrates how an observer is used as the torque detecting means.

A positional deviation counter 33 obtains the positional difference between a position command MCMD sent from the CNC CPU 21 to the screw rotating servo motor 9 and the actual rotational position of the screw rotating servo motor 9 detected by the position/speed detecting device 10. A position control section 34 obtains a speed command by multiplying the positional difference by a position loop gain. A speed deviation is obtained by subtracting the actual speed of the screw rotating servo motor 9 detected by the position/speed detecting device 10 from the speed command. A speed control section 35 obtains a current command u by performing speed loop processing, and a current control section 36 performs current loop processing for the obtained current command u, to drive the screw rotating servo motor 9.

An observer 37 receives the torque command (current command) u obtained by speed loop processing and the actual speed fed back from the position/speed detecting device 10 of the screw rotating servo motor 9, and estimates the screw torque (load torque).

The screw torque may be obtained by detecting the current for driving the screw rotating servo motor 9, instead of by using the above observer, or in an injection molding machine with a hydraulic motor, the screw torque may be obtained by detecting the hydraulic pressure of the hydraulic motor. Furthermore, a strain sensor may be mounted on the screw to obtain the screw torque.

Figure 4:
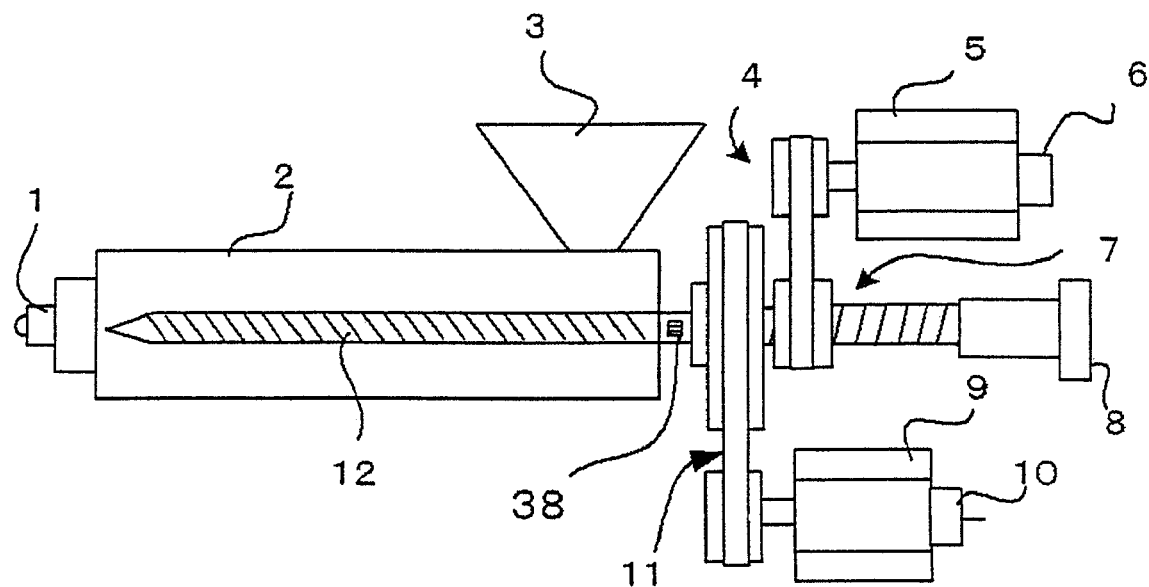
FIG. 4 illustrates how a strain sensor is used to obtain torque acting on the flight section of the screw.

FIG. 4 shows a strain sensor 38 attached to the surface of the screw 12 in an area outside the injection cylinder 2 to detect screw torque. The screw produces a strain due to torque, so the screw torque may be obtained by detecting the strain. If screw rotation is stopped by braking means, the screw torque may be detected by the strain sensor mounted on the screw.

Figure 5A:
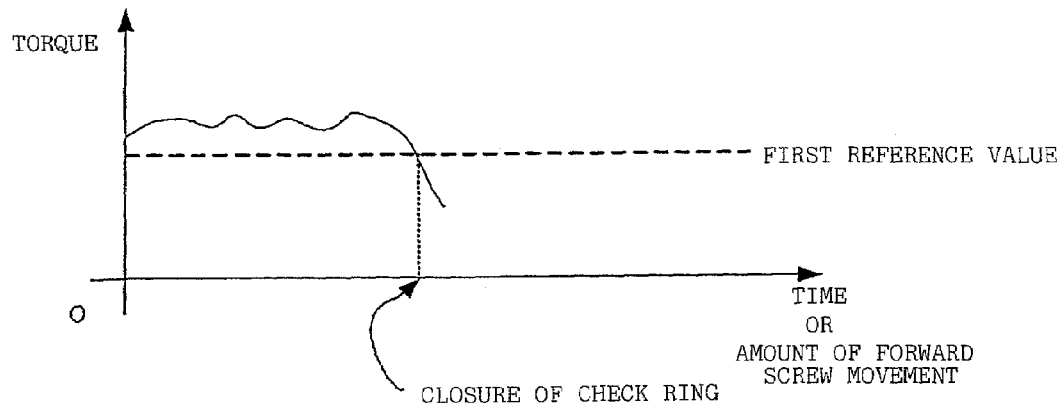
FIGS. 5A, 5B, and 5C respectively illustrate first, second, and third exemplary criteria used by check ring closure state determining means to determine whether the check ring is closed.
Figure 5B:
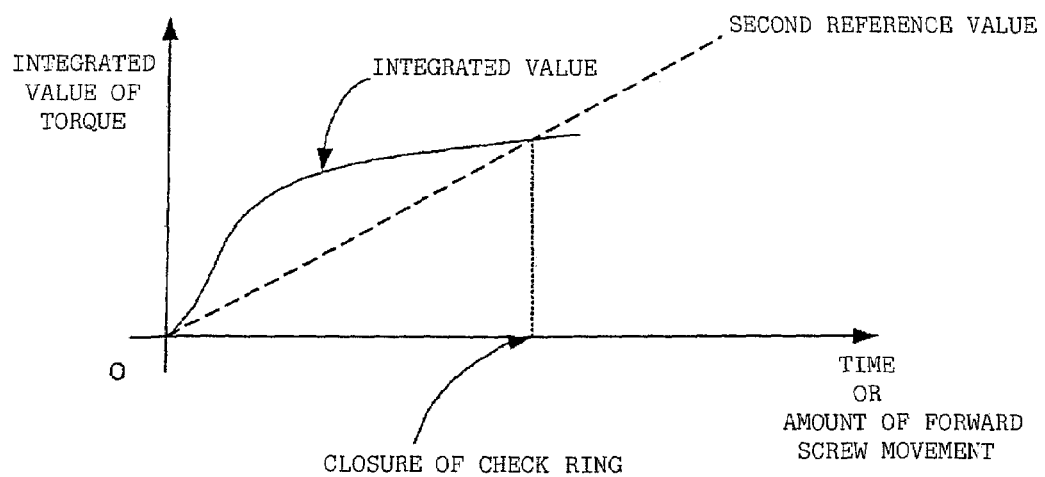
Figure 5C:
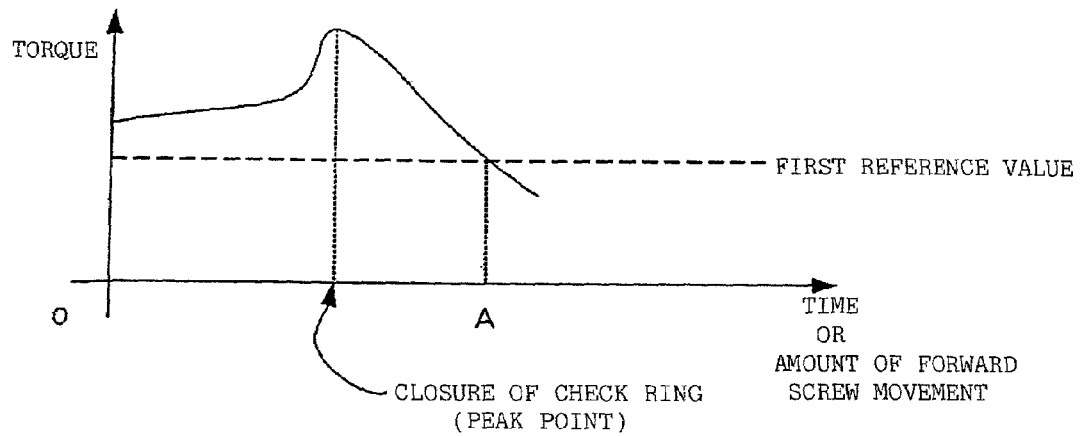

FIGS. 5A, 5B, and 5C illustrate respective exemplary criteria used by the check ring closure state determining means to determine whether the check ring is closed or not.

If the check ring is open, rotating in reverse flow of resin occurs at the start of forward movement of the screw. The resin backflow increases the screw torque. When the check ring closes, the screw torque starts to decrease. The varying torque is compared with a preset reference value to determine whether the check ring is closed or not.

In FIG. 5A, the preset torque value is used as a first reference value: the check ring is determined not to be closed when the torque is greater than the first reference value, and to be closed when the torque is less than or equal to the first reference value. In the graph shown in FIG. 5A, the horizontal axis represents time from a point of time when injection starts or amount of forward movement of the screw from a point of time when injection starts, and the vertical axis represents screw torque.

The screw reverse rotation control means controls reverse rotation of the screw on the basis of the determination by the check ring closure state determining means. More specifically, the screw reverse rotation control means rotates the screw in reverse when the check ring closure state determining means determines that the check ring is not closed, and stops the reverse rotation of the screw when the check ring closure state determining means determines that the check ring is closed.

The screw may be rotated in reverse from a point of time when the screw starts moving forward until a first predetermined time elapses, or from a point of time when the screw starts moving forward until the screw has moved forward a first predetermined distance, regardless of the determination by the check ring closure state determining means. The reverse rotation of the screw may be stopped at a point of time when a second predetermined time has elapsed since the check ring was determined to be closed, or at a point of time when the screw has moved forward a second predetermined distance from the screw position at a point of time when the check ring was determined to be closed.

In FIG. 5B, torque is integrated with respect to time or amount of forward movement of the screw, and the integrated value is used to determine whether the check ring is closed. Unlike the first reference value shown in FIG. 5A, the second reference value, with which the integrated value of torque is compared, is not constant, but increases with time or amount of forward movement of the screw as shown in FIG. 5B. The second reference value may be obtained by, for example, integrating the above first reference value in FIG. 5A. When the integrated value of the screw torque is greater than the second reference value, the check ring is determined not to be closed, and when the integrated value of the screw torque is less than or equal to the second reference value, the check ring is determined to be closed. Because the screw torque due to resin backflow during forward movement of the screw is usually not negative, the integrated value of the torque does not decrease; since the second reference value increases as shown in FIG. 5B, as the screw torque decreases, the integrated value of the torque becomes equal to and then less than the second reference value. In low-speed injection, because the screw torque is small, comparison of the integrated value of the torque with the second reference value enables the closure of the check ring to be detected with higher accuracy than obtained by the comparison in FIG. 5A.

In the case of FIG. 5B, the screw reverse rotation control means controls reverse rotation of the screw as in the case of FIG. 5A.

In FIG. 5C, a closure determination on the basis of peak torque is added to the closure determination in FIG. 5A. After the check ring is determined not to be closed because the torque is greater than the first reference value, the check ring is determined to close at a point of time when the torque reaches a peak and the check ring is determined to remain closed after the point of time when the peak appears. In the case of FIG. 5C, the screw reverse rotation control means controls reverse rotation of the screw as in the case of FIG. 5A, by stopping reverse rotation of the screw when the check ring is determined to be closed due to occurrence of the peak torque.

The closure of the check ring is usually determined earlier by the closure determination in FIG. 5C than by the closure determination in FIG. 5A above. For example, if the closure determination in FIG. 5A is applied to the torque variations shown in FIG. 5C, the check ring is determined to be closed at point A in FIG. 5C, which is later than a point of time when the check ring is determined to be closed by the closure determination in FIG. 5C.

If the variations in the torque show a monotonic decrease, the torque does not reach a peak and the closure of the check ring is not determined with the closure determination in FIG. 5C, but the closure determination in FIG. 5A is also applied, so the check ring is determined to be closed when the torque becomes less than or equal to the first reference value (point A).

Figure 6:
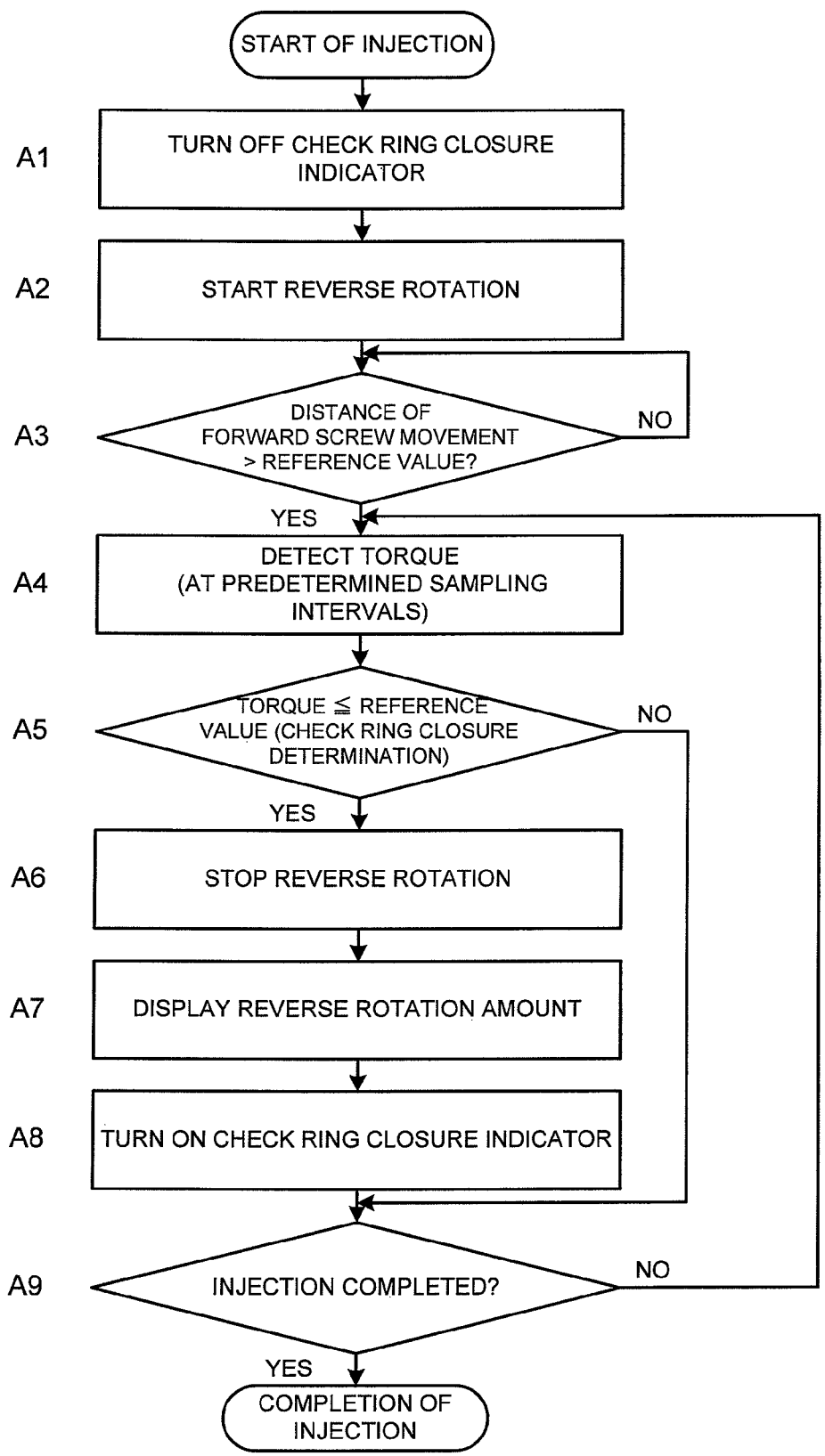
FIG. 6 is a flowchart illustrating a first exemplary algorithm for determining whether the check ring is closed or not and for starting and stopping reverse rotation of the screw on the basis of the determination.
Figure 7:
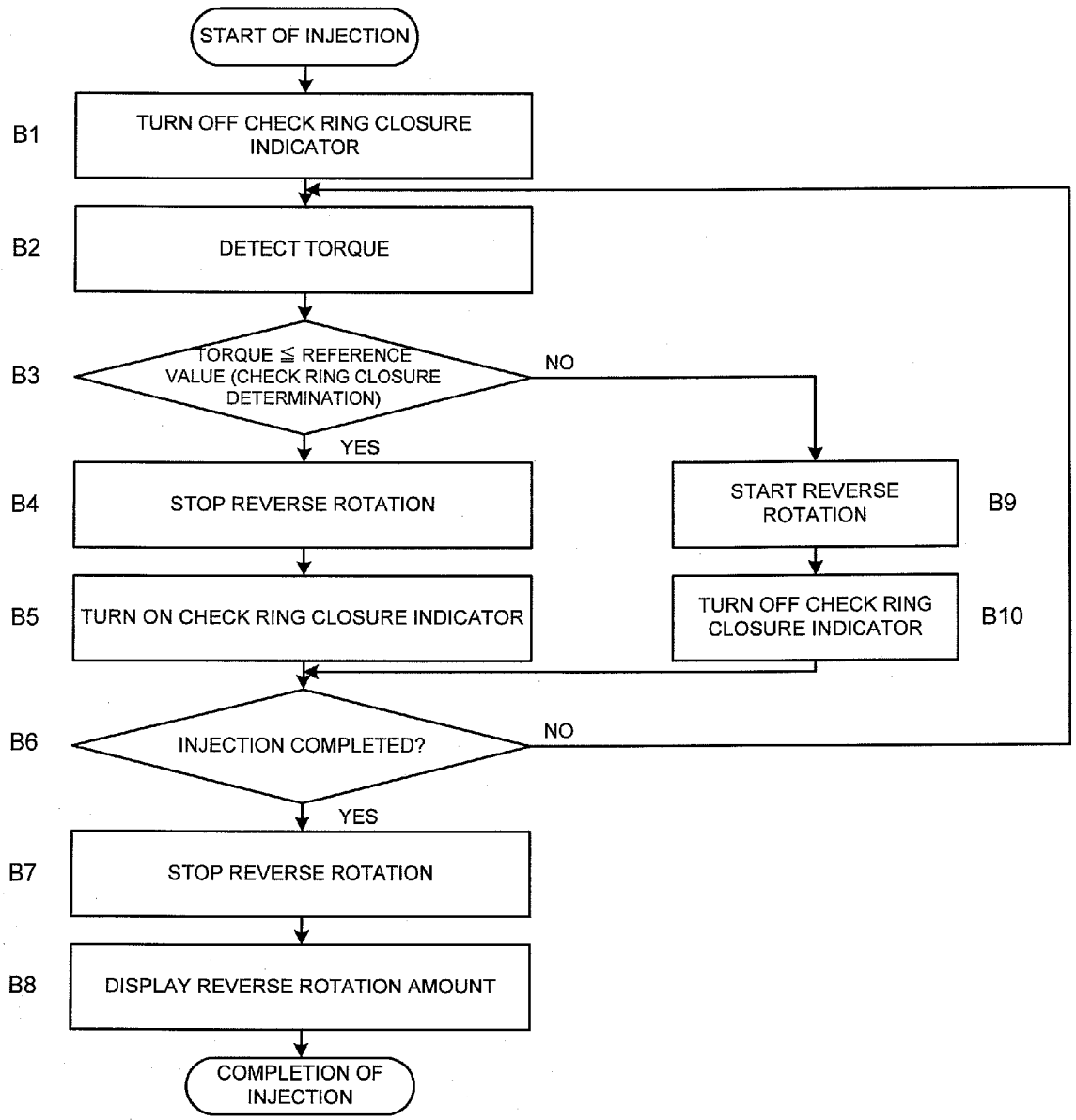
FIG. 7 is a flowchart illustrating a second exemplary algorithm for determining whether the check ring is closed or not and for starting and stopping reverse rotation of the screw on the basis of the determination.
Figure 8:
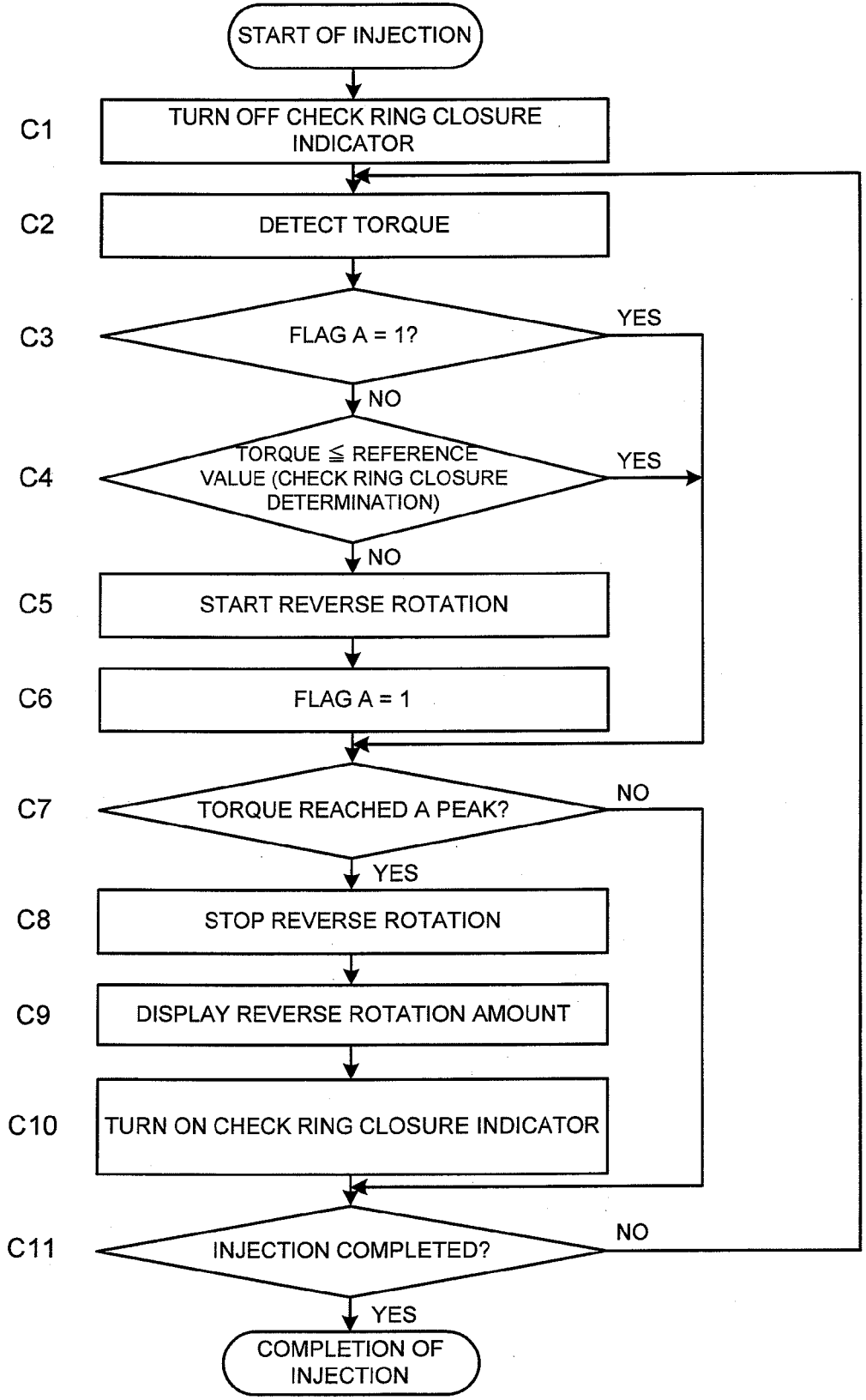
FIG. 8 is a flowchart illustrating a third exemplary algorithm for determining whether the check ring is closed or not and for starting and stopping reverse rotation of the screw on the basis of the determination.

FIGS. 6 to 8 are flowcharts illustrating algorithms for determining whether the check ring is closed and for starting and stopping reverse rotation of the screw on the basis of the determination.

In the processing shown in FIG. 6, reverse rotation of the screw is started upon the start of injection; screw torque is then compared with a preset reference value; whether the check ring is closed or not is determined on the basis of the comparison result; and the reverse rotation of the screw is stopped when the check ring is determined to be closed.

When injection starts, the check ring closure indicator is turned off (Step A1) and reverse rotation of the screw is started (Step A2). The distance of forward movement of the screw from the screw position at a point of time when injection starts is checked repeatedly until the screw has moved forward a predetermined distance from that screw position (Step A3). When the screw has moved forward the predetermined distance, torque acting on the flight section of the screw is detected (Step A4). The torque is detected at predetermined sampling intervals.

Next, whether the screw torque is less than or equal to the reference value is determined (Step A5). As a result, if the screw torque is greater than the reference value (screw torque is initially greater than the reference value), the reverse rotation of the screw started in Step A2 is not stopped, and control proceeds to Step A9 where whether injection is completed or not is determined (Step A9). If injection is not yet completed, control returns to Step A4 where screw torque is detected again.

If the screw torque is less than or equal to the reference value (Step A5, determination result 'YES'), the reverse rotation of the screw is stopped (Step A6), the amount of reverse rotation of the screw is displayed (Step A7), and the check ring closure indicator is turned on (Step A8).

Then, whether injection is completed or not is determined (Step A9). If injection is not completed, control returns to Step A4 where screw torque is detected again. If injection is completed, the processing in FIG. 6 is completed.

In the processing in FIG. 6, whether or not the screw has moved forward a predetermined distance from the screw position at a point of time when injection starts is determined in Step A3, but instead, the time from when injection starts may be checked repeatedly until a predetermined time has elapsed from a point of time when injection starts.

In the processing shown in FIG. 7, whether the check ring is closed or not is determined on the basis of comparison of screw torque with a reference value; reverse rotation of the screw is stopped when the check ring is determined to be closed; and the screw is rotated in reverse when the check ring is determined not to be closed.

When injection starts, the check ring closure indicator is turned off (Step B1) and screw torque is detected (Step B2). Whether the detected torque is less than or equal to the reference value is determined (Step B3), and if the detected torque is greater than the reference value (screw torque is initially greater than the reference value), reverse rotation of the screw is started (Step B9), the check ring closure indicator is turned off (Step B10), and whether injection is completed or not is determined (Step B6).

If the detected screw torque is less than or equal to the reference value (Step B3, determination result 'YES'), the reverse rotation of the screw started in Step B9 is stopped (Step B4) and the check ring closure indicator is turned on (Step B5). Then, whether injection is completed or not is determined (Step B6).

If it is determined that injection is not yet completed in Step B6, control returns to Step B2 where torque is detected again. If it is determined that injection is completed, processing for stopping the reverse rotation of the screw is performed (Step B7), the amount of reverse rotation of the screw detected in Step B2 is displayed (Step B8), and the processing in FIG. 7 is completed.

In the processing shown in FIG. 8, whether the check ring is closed is determined on the basis of a comparison of screw torque with a reference value, and with the result of this determination, reverse rotation of the screw is started at a point of time when the screw torque is greater than the predetermined value. Then, whether the check ring is closed or not is determined on the basis of a peak screw torque after the start of the reverse rotation of the screw, and when the check ring is determined to be closed, the reverse rotation of the screw is stopped.

When injection starts, the check ring closure indicator is turned off (Step C1) and torque is detected (Step C2). Next, whether a flag A is set (A=1) or not is determined (Step C3). If the flag A is not set (the flag A is '0' initially), whether or not the screw torque is less than or equal to the reference value is then determined (Step C4). If the screw torque is greater than the reference value (screw torque is initially greater than the reference value), reverse rotation of the screw is started (Step C5) and the flag A is set (A=1) (Step C6). Then, whether the torque has reached a peak or not is determined (Step C7).

If the flag A is already set (Step C3, determination result 'YES') or the screw torque is less than or equal to the reference value (Step C4, determination result 'YES'), control proceeds to Step C7 where whether the torque has reached a peak or not is determined.

If the torque has not yet reached a peak (Step C7, determination result 'NO') and injection is not completed (Step C11, determination result 'NO'), control proceeds from Step C7 to Step C11 and then returns to Step C2 where screw torque is detected again.

If the torque has reached a peak (Step C7, determination result 'YES'), the reverse rotation of the torque started in Step C5 is stopped (Step C8). Then, the amount of reverse rotation of the screw is displayed (Step C9) and the check ring closure indicator is turned on (Step C10). Whether injection is completed is determined (Step C11), and if injection is not completed or not, control returns to Step C2 where screw torque is detected again, or if injection is completed, the processing in FIG. 8 is completed.

According to the features of an injection molding machine of the present invention, it determines, as described above, whether or not the check ring is closed during forward movement of the screw and rotates the screw in reverse by the amount necessary to close the check ring. These features are applicable to known injection molding machines having a screw equipped with a check ring, including:

(1) Injection molding machines described in, for example, Japanese Patent Application Laid-Open No. 62-060621:

In injection molding machines of this type, when the screw is moved forward, the pressure in front of the check ring rises, thereby producing a pressure difference with respect to the pressure in back of the check ring, which causes the check ring to close. Rotating the screw in reverse while moving it forward produces the effect of lowering the pressure in back of the check ring, thereby accelerating the closure of the check ring. Therefore, the features of the present invention are applicable to injection molding machines of this type.

(2) Injection molding machines described in, for example, Japanese Patent Applications Laid-Opens No. 3-45325, No. 4-71817, and No. 9-174629:

In injection molding machines of this type, when the screw is rotated in positive direction, a first resin flow path and a second resin flow path in the check ring are mutually aligned to form a continuous path. When the screw is rotated in reverse, the first and second resin flow paths of the check ring are taken out of alignment, creating a seal. To close the check ring in this type of injection molding machine, the screw is rotated in reverse after metering is completed, until injection starts. When the features of the present invention are applied to this type of injection molding machine, if injection is performed while the check ring is not completely closed as a result of reverse rotation of the screw after the completion of metering, it is possible to rotate the screw in reverse during injection process so as to close the check ring.

(3) Injection molding machines described in, for example, Japanese Examined Patent Publication No. 47-8380 and Japanese Patent Applications Laid-Open Nos. 60-201921 and 62-19423:

In injection molding machines of this type, when a screw is rotated in reverse, a check ring moves rotating in reverse relative to the screw, so that the resin flow path is sealed by the check ring. This check ring is closed by rotating the screw in reverse, or by moving the screw forward. Therefore, the features of the present invention are also applicable to injection molding machines of this type.

What is claimed is:

1. An injection molding machine comprising:
    a screw equipped with a check ring;
    a torque detecting means for detecting torque acting on the screw during forward movement of the screw;
    a check ring closure state determining means for determining whether the check ring is closed or not on the basis of the torque detected by said torque detecting means; and
    a screw reverse rotation control means for controlling reverse rotation of the screw on the basis of the determination by said check ring closure state determining means,
    wherein the check ring closure state determining means is configured to compare the torque during forward movement of the screw with a first reference value, to determine that the check ring is not closed when the torque is greater than the first reference value, and to determine that the check ring is closed when the torque is less than or equal to the first reference value.

2. The injection molding machine according to claim 1, wherein, after determining that the check ring is not closed because the torque is greater than the first reference value, the check ring closure state determining means is configured to determine that the check ring is closed at a time when the torque reaches a peak and to determine that the check ring remains closed after a point of time when the peak appears.

3. The injection molding machine according to claim 1, wherein, on the basis of the determination by said check ring closure state determining means, said screw reverse rotation control means is configured to rotate the screw in reverse when the check ring is determined not to be closed and to stop reverse rotation of the screw when the check ring is determined to be closed.

4. The injection molding machine according to claim 3, wherein said screw reverse rotation control means rotates the screw in reverse from a point of time when the screw starts moving forward until a first predetermined time elapses, or until the screw moves forward a first predetermined distance from the screw position at a point of time when the screw starts moving forward, regardless of the determination by the check ring closure state determining means.

5. The injection molding machine according to claim 3, wherein said screw reverse rotation control means stops reverse rotation of the screw after a second predetermined time has elapsed since said check ring closure state determining means determined that the check ring was closed, or after the screw has moved forward a second predetermined distance from the screw position at a point of time when the check ring was determined to be closed.

6. The injection molding machine according to claim 1, further comprising display means for displaying an amount of reverse rotation of the screw from when the screw starts rotating in reverse until the check ring closure state determining means determines that the check ring is closed.

7. The injection molding machine according to claim 2 wherein on the basis of the determination by said check ring closure state determining means, said screw reverse rotation control means rotates the screw in reverse when the check ring is determined not to be closed and stops reverse rotation of the screw when the check ring is determined to be closed.

8. An injection molding machine comprising:
    a screw equipped with a check ring;
    a torque detecting means for detecting torque acting on the screw during forward movement of the screw;
    a check ring closure state determining means for determining whether the check ring is closed or not on the basis of the torque detected by said torque detecting means; and
    a screw reverse rotation control means for controlling reverse rotation of the screw on the basis of the determination by said check ring closure state determining means, wherein said check ring closure state determining means is configured to compare an integrated value of the torque from the start of forward movement of the screw to a current time with a second reference value, to determine that the check ring is not closed when the integrated value of the torque is greater than the second reference value, and to determine that the check ring is closed when the integrated value of the torque is less than or equal to the second reference value.

9. The injection molding machine according to claim 8 wherein on the basis of the determination by said check ring closure state determining means, said screw reverse rotation control means rotates the screw in reverse when the check ring is determined not to be closed and stops reverse rotation of the screw when the check ring is determined to be closed.

* * * * *